(12) United States Patent
Henry et al.

(10) Patent No.: US 11,760,464 B2
(45) Date of Patent: Sep. 19, 2023

(54) YAW ALLEVIATION MECHANISM FOR AIRCRAFT COLLISION

(71) Applicant: U.S. Army DEVCOM Army Research Laboratory, Adelphi, MD (US)

(72) Inventors: Todd C. Henry, Aberdeen, MD (US); John T. Hrynuk, Joppa, MD (US); Christopher M. Kroninger, Wallingford, PA (US); Michael R. Dorothy, Aberdeen, MD (US); Robert A. Haynes, Yorktown, VA (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 295 days.

(21) Appl. No.: 17/326,911

(22) Filed: May 21, 2021

(65) Prior Publication Data
US 2022/0371719 A1 Nov. 24, 2022

(51) Int. Cl.
*B64C 3/40* (2006.01)
*B64D 25/00* (2006.01)

(52) U.S. Cl.
CPC .............. *B64C 3/40* (2013.01); *B64D 25/00* (2013.01)

(58) Field of Classification Search
CPC .................. B64C 3/40; B64D 25/00
See application file for complete search history.

(56) References Cited

U.S. PATENT DOCUMENTS

| | | | |
|---|---|---|---|
| 3,839,818 A * | 10/1974 | Heggedal | A63H 27/007 446/68 |
| 5,671,899 A * | 9/1997 | Nicholas | B64C 3/56 244/3.28 |
| 6,056,237 A * | 5/2000 | Woodland | F42B 12/365 244/49 |
| 9,296,468 B1 * | 3/2016 | Harvey | B64C 39/024 |
| 9,545,991 B1 * | 1/2017 | Alley | B64C 39/024 |
| 2016/0176502 A1 * | 6/2016 | Snook | B64C 3/546 244/218 |

* cited by examiner

*Primary Examiner* — Justin M Benedik
(74) *Attorney, Agent, or Firm* — Christos S. Kyriakou (57) ABSTRACT

A yaw alleviation device for an aircraft containing rotatable wing roots attached to wings. The device includes a spring configured to operatively connect to a wing; and a buckling member to operatively connect to the wing. The spring is configured to extend from an original unstrained position upon the buckling member undergoing buckling from an original unbuckled position to cause rotation of one or both wings in rotationally opposite directions. The buckling member may be positioned parallel and at an offset distance to the spring.

20 Claims, 10 Drawing Sheets

FIG. 7D

YAW ALLEVIATION MECHANISM FOR AIRCRAFT COLLISION

GOVERNMENT INTEREST

The embodiments herein may be manufactured, used, and/or licensed by or for the United States Government without the payment of royalties thereon.

BACKGROUND

Technical Field

The embodiments herein generally relate to aircraft flight control mechanisms, and more particularly to yaw alleviation mechanisms to control aircraft rotations.

Description of the Related Art

Current aircraft are not designed to recover from an unwanted wing collision, resulting in damage to and possible loss of the aircraft. The yaw moment generated by an outboard impact (i.e., a tree branch or other obstacle) is increased by airspeed and impact location outboard on the wing with no limit. Typically, a fixed wing aircraft will use the vertical stabilizer (rudder) to correct for yaw moments, caused by crosswinds or turning motions of the aircraft. The available corrective yaw moment is determined by the size of the tail and length of the fuselage and is constrained by geometric limitations. For situations where the yaw moment is too high the vehicle will not recover from impact induced yaw moments, resulting in a flat-spin and likely loss of the aircraft. Accordingly, there is a need for a mechanism that limits the yaw moment to a designed value from which the vehicle can recover and avoid damage especially for low to the ground flight.

SUMMARY

In view of the foregoing, an embodiment herein provides a yaw alleviation device for an aircraft containing rotatable wing roots attached to wings, the device comprising a spring configured to operatively connect to a wing; and a buckling member to operatively connect to the wing, wherein the spring is configured to extend from an original unstrained position upon the buckling member undergoing buckling from an original unbuckled position to cause rotation of one or both wings in rotationally opposite directions. The buckling member may be positioned parallel and at an offset distance to the spring. The spring may operatively connect to the wing root on each side of the aircraft. The buckling member may operatively connect to the wing root on each side of the aircraft. The rotation of one or both wings in rotationally opposite directions may alleviate some of the yaw moment imparted on one of the wings. The yaw moment imparted on one of the wings may be a result of an air collision creating a force on one of the wings. Upon removal of yaw moment, the spring may contract back to the original unstrained position and the buckling member may unbuckle back to the original unbuckled position causing both of the wings to rotate back to an original wing position. The rotation of both of the wings may occur upon the yaw moment exceeding a buckling moment derived by a buckling force sufficiently large to cause the buckling member to buckle. The buckling member may comprise a material that is configured to buckle without fracturing. The buckling member may comprise any of a metal and/or a shape memory polymer material.

Another embodiment provides a system comprising an aircraft sub-system comprising an aircraft chassis; a first wing root pivotally attached to the aircraft chassis; a second wing root pivotally attached to the aircraft chassis and gear meshed to the first wing root; a first wing fixedly attached to the first wing root; and a second wing fixedly attached to the second wing root; a yaw alleviation device operatively connected to the aircraft sub-system, wherein the yaw alleviation device comprises a spring operatively connected to the first wing and the second wing; and a buckling member operatively connected to the first wing and the second wing, wherein the buckling member is positioned parallel and at an offset distance to the spring, wherein the spring is configured to extend from an original unstrained position upon the buckling member undergoing buckling from an original unbuckled position to cause a yaw rotation of the first wing root and the second wing root in rotationally opposite directions to counter a yaw moment imparted on one of the wings.

The yaw alleviation device may generate a resistive moment that resists a rotational moment associated with a buckling force of the buckling member times the offset distance. Upon the yaw moment being smaller than the resistive moment, the buckling member does not buckle and the spring does not extend. Upon the yaw moment being larger than the resistive moment, the buckling member buckles and the spring may extend. Upon the buckling member buckling and the spring extending causing rotation of the first wing root with the first wing and the second wing root with the second wing, the yaw moment becomes no greater than the resistive moment. Upon removal of the yaw moment, the spring may retract causing the first wing root with the first wing and the second wing root with the second wing to pivot to an original position relative to the aircraft chassis.

Another embodiment provides a method of performing yaw alleviation of an aircraft, the method comprising providing a yaw alleviation device operatively attached to wings on the aircraft, wherein the yaw alleviation device comprises a spring operatively connected to a first wing and a second wing of the aircraft; and a buckling member operatively connected to the first wing and the second wing. The method further comprises receiving a yaw moment from an impact force generated upon one of the wings of the aircraft; and actuating the yaw alleviation device by extending the spring from an original unstrained position to an extended position; and buckling the buckling member from an original unbuckled position to a buckled position, wherein extension of the spring and buckling of the buckling member causes a rotation of the first wing root and the second wing root in rotationally opposite directions from an original position to counter the yaw moment.

The method may comprise, upon removal of the yaw moment, retracting the spring to the original unstrained position and unbuckling the buckling member to the original unbuckled position causing the first wing root and the second wing root to pivot to the original position. The method may comprise pivoting the first wing root and the second wing root to the original position at a force proportional to a stiffness constant and extension distance of the spring. The method may comprise mechanically actuating the buckling member to buckle.

These and other aspects of the embodiments herein will be better appreciated and understood when considered in conjunction with the following description and the accompanying drawings. It should be understood, however, that the following descriptions, while indicating exemplary embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein provide a mechanism placed at the root of an airplane wing structure, coupling both wings together. The mechanism may alleviate undesired rotational (yawing) loads while holding the wings in place during regular operation. When the wing is impacted, the designed moment limit would be exceeded causing the mechanism to relax, reducing the forces and moments exerted on the aircraft allowing it to recover from the impact. The mechanism could also alleviate unwanted rotational moments such as alleviating impact forces in rotorcraft blades. The buckling member-spring pair mechanism can switch between a rigid and relaxed state. When rigid, the mechanism supports regular use by holding in place. Over the designed load limit, the mechanism passively relaxes limiting the applied moment to the mechanism by buckling the buckling member and then returning to the original rigid state by way of the spring when the external moment is removed. Referring now to the drawings, and more particularly to FIGS. 1 through 7D, where similar reference characters denote corresponding features consistently throughout the figures, there are shown preferred embodiments. In the drawings, the size and relative sizes of components, layers, and regions, etc. may be exaggerated for clarity.

Figure 1:
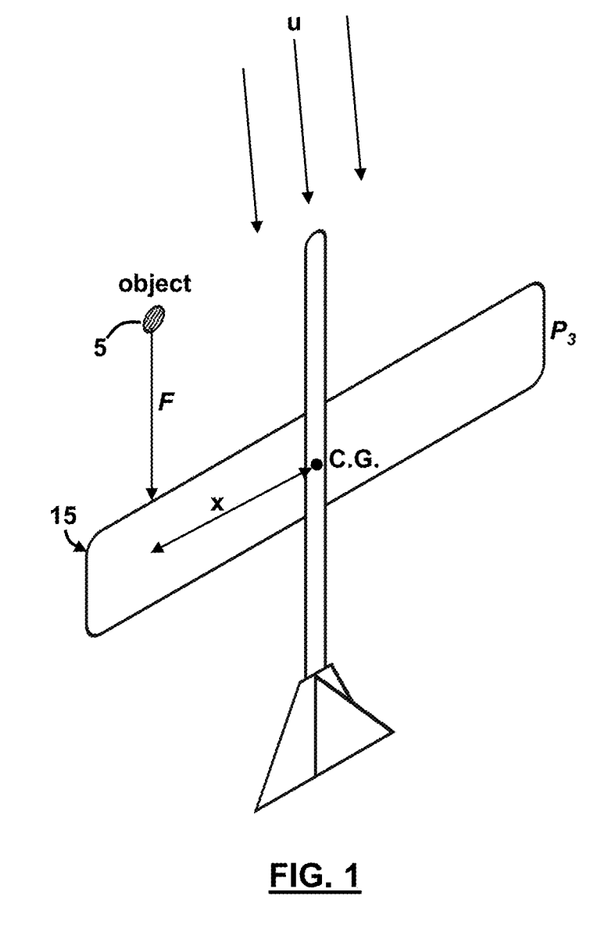
FIG. 1 is a schematic diagram illustrating the impact mechanics of an object striking an aircraft, according to an embodiment herein.
Figure 2A:
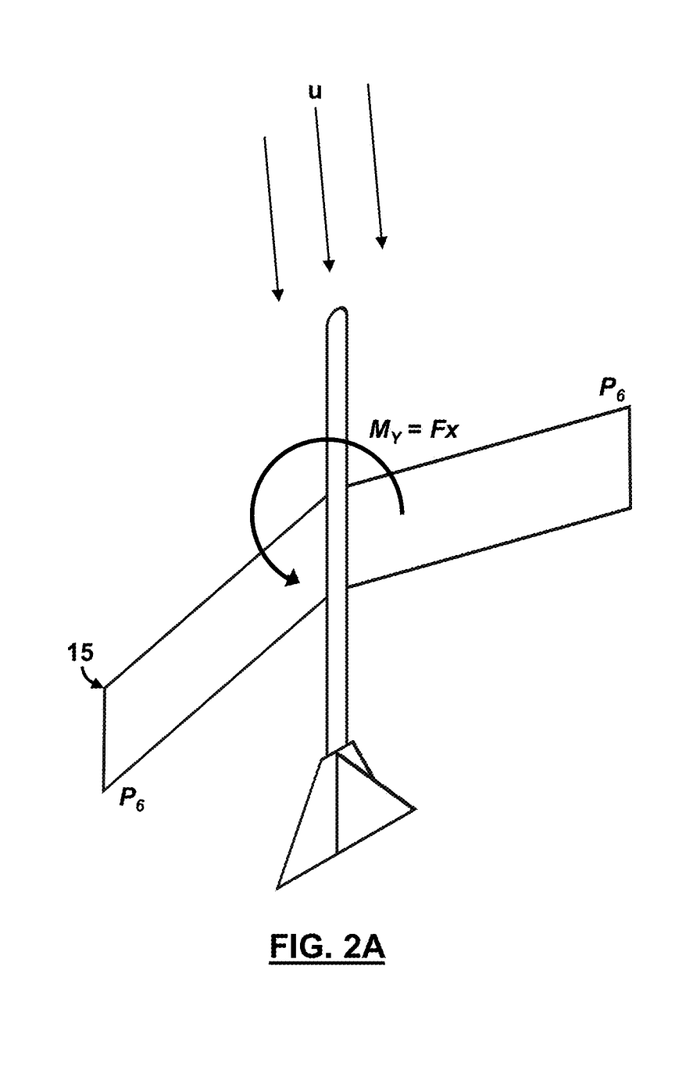
FIG. 2A is a schematic diagram illustrating a perspective view of the moment generation as a result of the impact by an object on an aircraft, according to an embodiment herein.
Figure 2B:
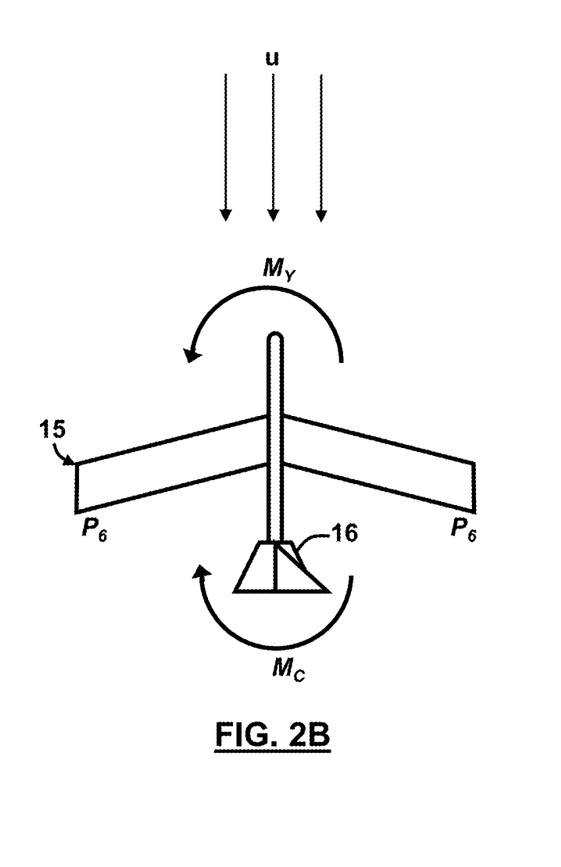
FIG. 2B is a schematic diagram illustrating a top view of the moment generation as a result of the impact by an object on an aircraft, according to an embodiment herein.

FIG. 1 depicts the impact mechanics associated with a fixed wing vehicle such as an aircraft 15. For fixed wing vehicles, impact by an object 5 with some force F at span location x from the center of gravity (C.G.) will result in a yaw moment $M_Y$ of F times x which is shown in FIG. 2A. A fixed wing vehicle may use the rudder 16 depicted in FIG. 2B to create a counter moment $M_C$. The rudder 16 is sized for typical maneuvers and as such is not able to create a moment large enough to counter $M_Y$ as $M_Y$ is simply too large compared to regular maneuver yaw moments. Upon excessive impact moment the vehicle will enter a spin and crash. $M_Y$ increases with flight speed and spanwise location at seemingly no limit while $M_C$ is limited by the aircraft geometry, that is the size of the tail.

Figure 3A:
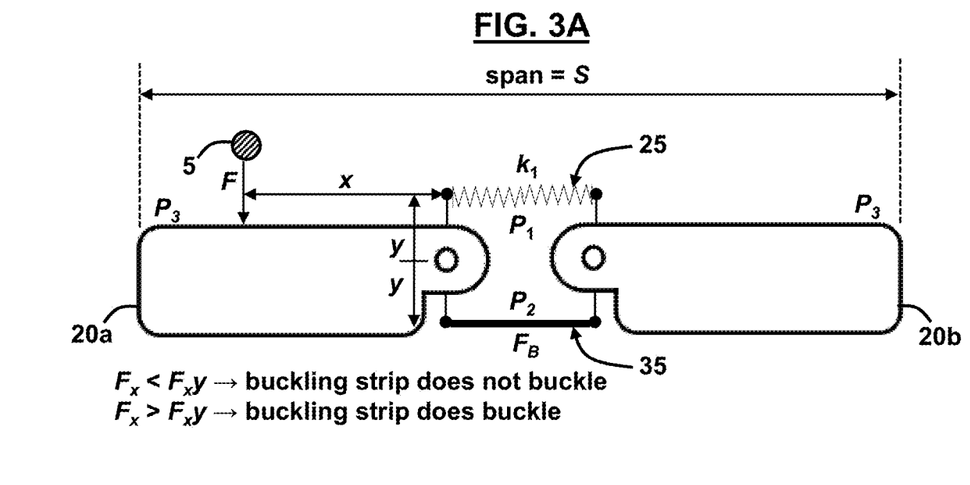
FIG. 3A is a schematic diagram illustrating an arrangement of a spring and rigid buckling member in an original position for yaw alleviation of an aircraft, according to an embodiment herein.
Figure 3B:
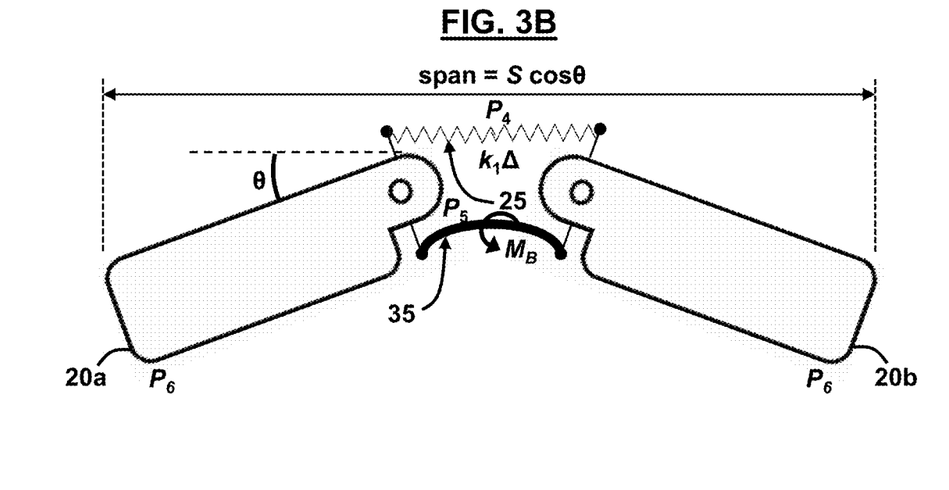
FIG. 3B is a schematic diagram illustrating an arrangement of a spring and buckled buckling member in an engaged position for yaw alleviation of an aircraft, according to an embodiment herein.
Figure 4A:
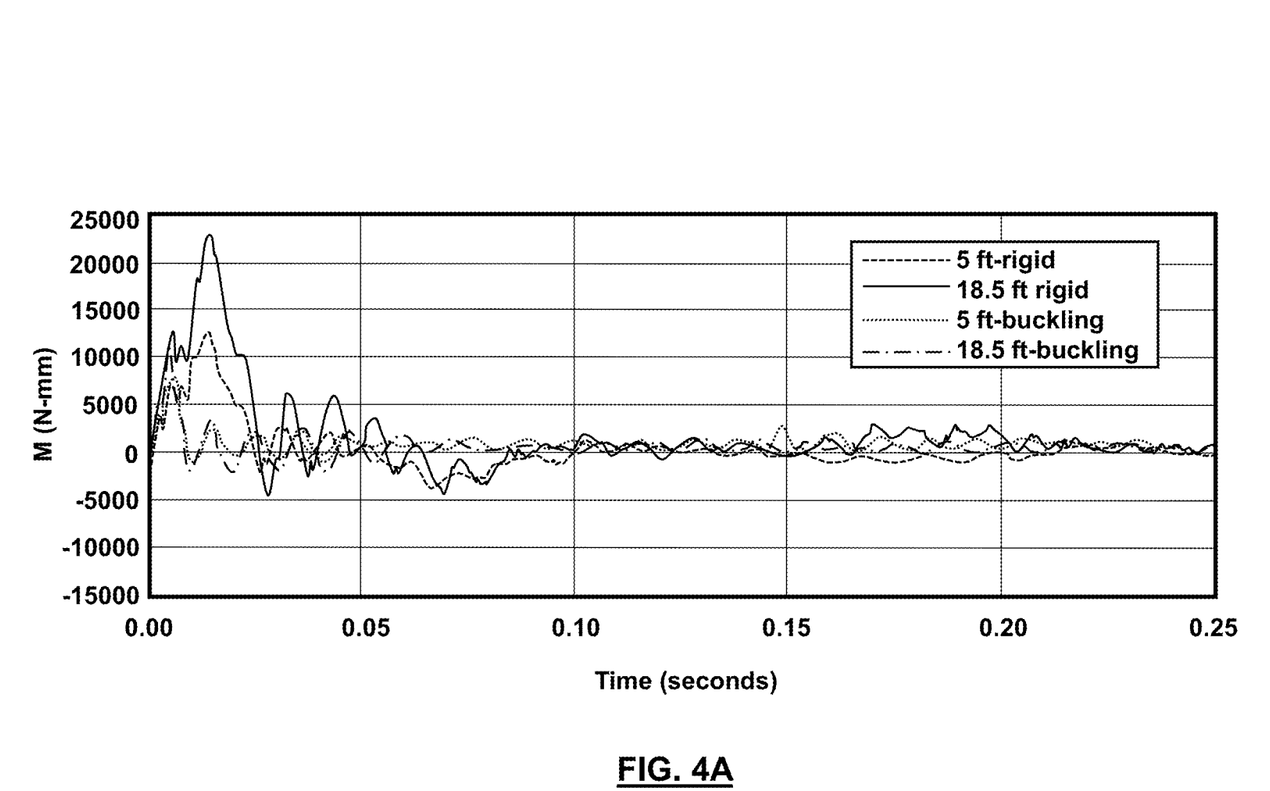
FIG. 4A is a graphical illustration showing experimental results of an impact yaw moment comparison between rigid and buckling tests at 5 ft or 18.5 ft drop heights between a time scale of 0-0.25 seconds, according to an embodiment herein.
Figure 4B:
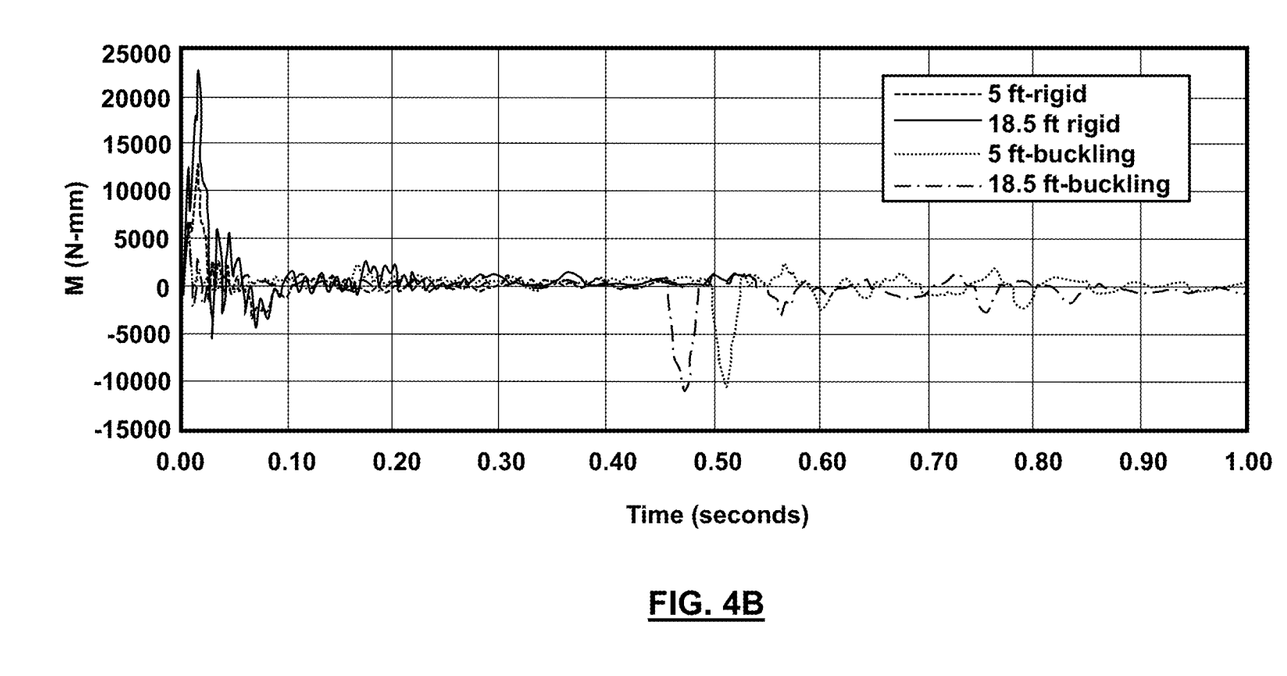
FIG. 4B is a graphical illustration showing experimental results of an impact yaw moment comparison between rigid and buckling tests at 5 ft or 18.5 ft drop heights between a time scale of 0-1 seconds, according to an embodiment herein.

FIGS. 3A and 3B, with reference to FIGS. 1 through 2B, illustrate a spring 25 and buckling member 35 are mounted substantially parallel to one another, although other configurations are possible, at some offset lengthy connected to the wing root 20a, 20b. The wing root 20a, 20b may be pinned to have no rotational stiffness other than the spring 25 and buckling member 35. The spring 25 and buckling member 35 collectively resist rotational moments associated with $F_B$, which is the buckling force of the buckling member 35 times y the offset distance. This resistive (buckling) moment $M_B$ is $F_B$ times y and is larger than regular maneuver loads making an aircraft wing behave as perfectly rigid for regular flight. If an object 5 strikes the vehicle (e.g., an aircraft, etc.) and imparts a moment ($M_Y$) smaller than $F_B$ times y, then the wing will not buckle. One can imagine this limit is related to the vehicles ability to recover and resist yaw forces with the tail (which may be related to $M_C$). In the event that $M_Y$ is larger than the buckling moment $M_B$ (i.e., $F_B$ times y) the wing swings backwards limiting the impact moment to $F_B$ times y. The impact moment $M_C$ cannot be larger than this designed value $F_B$ times y regardless of impact location or speed and as such the vehicle will be able to recover from impacts utilizing the spring 25 and buckling member 35. When the yaw moment $M_Y$ is removed, the spring 25 restores the wing to the original position with force $k_1$ times Δ unbuckling the buckling member 35 as the spring 25 and buckling member 35 return back to their original configurations.

For a small unmanned aerial system, impacts may be from high-speed flight low to the ground, which may be in the form of trees or wires. If one detects the object 5 but cannot maneuver to avoid collision using the traditional control surfaces of the vehicle, then the vehicle operator may actively buckle the buckling member 35 to shorten the wingspan and penetrate smaller spaces. The buckling member 35 may be buckled mechanically or by way of stimulus sensitive material such as a shape memory polymer. For example, if the wingspan S is 200 mm and the wing swings backwards at an angle θ=45°, then the collapsed span would only be 200 times the cosine of 45° or 140 mm and would be limited by the fuselage width. In the buckled state, $M_Y$ will also be significantly reduced as the stiffness of the wing is very low when the buckling member 35 is buckled.

Experimental data shows that the above assertions regarding the yaw moment $M_Y$ limitation are realized in practice. For the two different drop heights shown in FIGS. 4A and 4B, the peak yaw moment ($M_Y$) when the spring 25 and buckling member 35 are used (i.e., "buckling" shown in FIGS. 4A and 4B) is approximately the same, and not increasing. Without the spring 25 and buckling member 35 (i.e., "rigid" in FIGS. 4A and 4B), the peak yaw moment $M_Y$ increases as a function of the drop height. The peak moment when the mechanism containing the spring 25 and buckling member 35 according to the embodiments herein are in place remains nearly constant (~8000 N-mm) and is reduced by greater than 50% compared to the rigid cases (12000 N-m or 22000 N-mm). At approximately 0.5 seconds post impact time, the spring 25 and buckling member 35 mechanism can be seen to experience a yaw moment $M_Y$ in the opposite direction as the spring 25 pulls the wing forward back to its original position. The experimental data demonstrates improved results utilizing the spring 25 and buckling member 35 as a yaw alleviation mechanism/device in accordance with the embodiments herein.

Figure 5A:
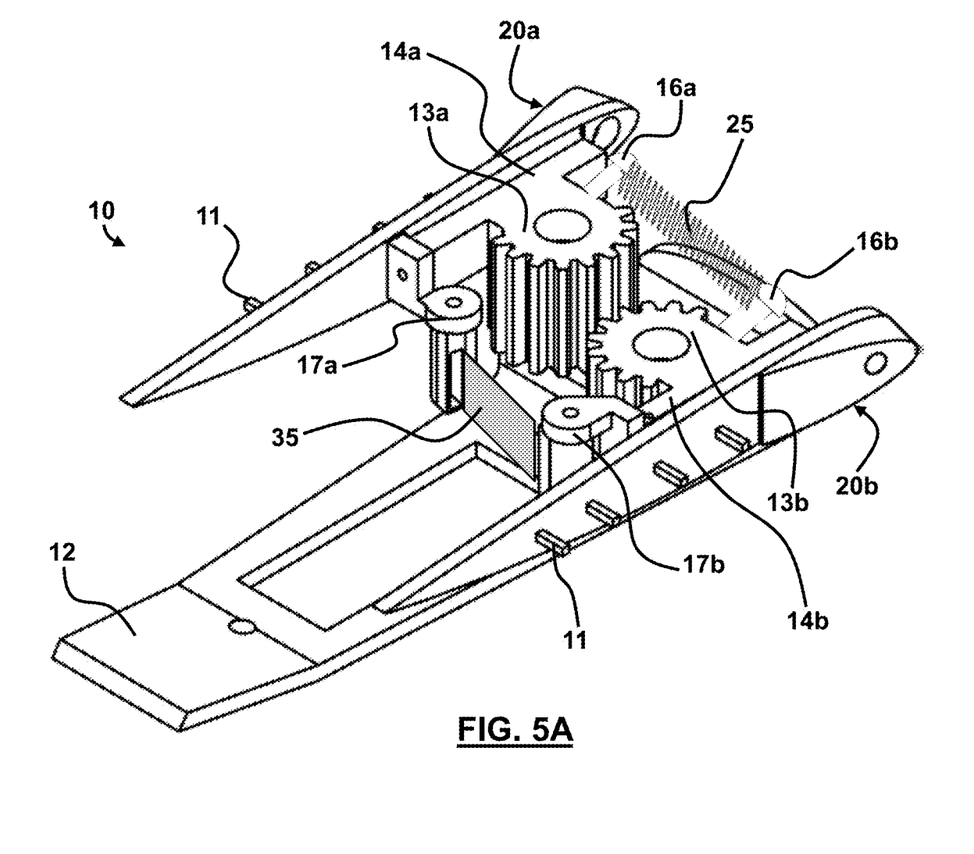
FIG. 5A is a schematic diagram illustrating a perspective view of a yaw alleviation device, according to an embodiment herein.
Figure 5B:
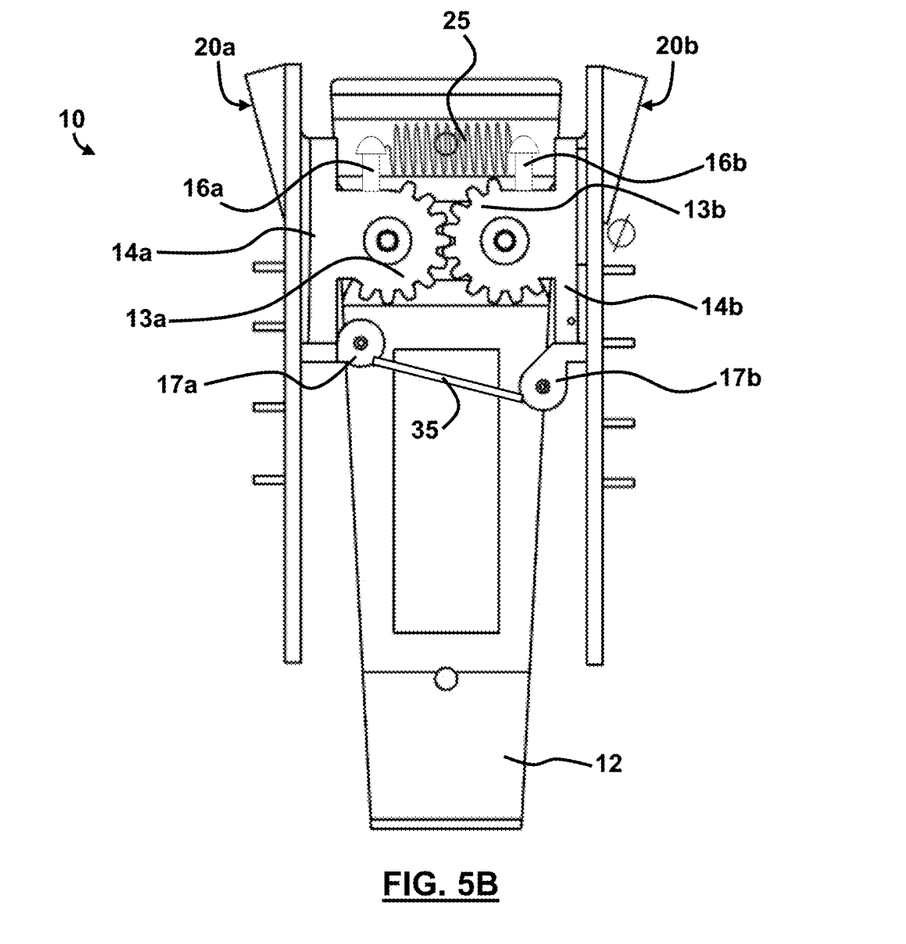
FIG. 5B is a schematic diagram illustrating a top view of a yaw alleviation device, according to an embodiment herein.

FIGS. 5A and 5B, with reference to FIGS. 1 through 4B, illustrate a yaw alleviation device 10 for an aircraft 15 (not shown in FIGS. 5A and 5B) containing rotatable wing roots 20a, 20b attached to wings 30a, 30b (not shown in FIGS. 5A and 5B). For ease of explanation, in FIGS. 5A and 5B, the elongated lateral components with pegs 11 projecting therefrom are designated as the wing roots 20a, 20b. However, the wing roots 20a, 20b can be separate structures apart from these depicted components and can take the form of any suitable shape or configuration, and the embodiments herein are not restricted to the configuration depicted in FIGS. 5A and 5B with respect to the wing roots 20a, 20b or other components. The device 10 comprises a base 12 and a pair of gears 13a, 13b that comprise teeth that complementarily engage each other to create a pivoting action for the wing roots 20a, 20b. The base 12 may operatively connect to the fuselage section of the aircraft 15, according to an example. The pair of gears 13a, 13b may be attached to mounts 14a, 14b, which then attach to the respective wing roots 20a, 20b. In an example, the base 12 may be elongated to support all of the connected components. However, the base 12 is not restricted to this particular configuration in accordance with the embodiments herein. According to an example, the pair of gears 13a, 13b may be configured to have different heights from each other. In another example, the pair of gears 13a, 13b may have the same height as each other.

The device 10 further comprises a pair of tension spring mounts 16a, 16b connected to the pair of gears 13a, 13b. A spring 25 is connected between the pair of tension spring mounts 16a, 16b such that the pair of tension spring mounts 16a, 16b hold the spring 25 in a substantially rigid configuration when the pair of gears 13a, 13b are in their non-pivoted configuration (such as shown in FIGS. 5A and 5B). From the original position, to a stressed position due to an impact from an object 5 on the wings 30a/30b of the aircraft 15, when the pair of gears 13a, 13b rotate, then the connected pair of tension spring mounts 16a, 16b also rotate thereby causing the spring 25 to elongate/stretch (as shown in FIG. 3B). The spring 25 may comprise any suitable type of tension spring 25 such as a coil spring. On the opposite side of the pair of gears 13a, 13b, the device 10 comprises a pair of buckling member mounts 17a, 17b that are connected to the mounts 14a, 14b. A buckling member 35 is connected between the pair of buckling member mounts 17a, 176b. From the original position, to a stressed position due to an impact from an object 5 on the wings 30a/30b of the aircraft 15, when the pair of gears 13a, 13b rotate, then the connected pair of mounts 14a, 14b also rotate thereby causing the buckling member mounts 17a, 17b to rotate, which causes the buckling member 35 to buckle (as shown in FIG. 3B).

According to some examples, the buckling member 35 may comprise any of a metal and/or a shape memory polymer material. However, the buckling member 35 may comprise any other type of material that is configured to buckle without fracturing. Additionally, the buckling member 35 may have any suitable shape or configuration with which repeatable elastic buckling is ideal, not causing fatigue failures. According to an example, the buckling member 35 may be positioned parallel and at an offset distance 2y (shown in FIG. 3A) to the spring 25. According to another example, the buckling member 25 may be positioned at an offset angle with respect to the spring 25 (shown in FIG. 5B).

Through the device 10, the spring 25 is configured to operatively connect to a wing 30a/30b. In particular, the spring 25 may operatively connect to the wing 30a/30b through the aircraft fuselage or a wing inboard of a wing hinge and a wing outboard of the wing hinge. Through the device 10, the buckling member 35 is configured to operatively connect to the wing 30a/30b. In particular, the buckling member 35 may operatively connect to the wing 30a/30b through the aircraft fuselage or the wing inboard of the wing hinge and the wing outboard of the wing hinge.

In an example, the spring 25 may operatively connect to the wing root 20 on each side of the aircraft 15, and the buckling member 35 may operatively connect to the wing root 20 on each side of the aircraft 15. Accordingly, the spring 25 is configured to extend from an original unstrained position $P_1$ (shown in FIG. 3A) upon the buckling member 35 undergoing buckling from an original unbuckled position $P_2$ (shown in FIG. 3A) to cause rotation of one or both wing roots 20a, 20b and thus the wings 30a, 30b in rotationally opposite directions (as shown in FIG. 3B). The rotation of one or both wings 30a, 30b in rotationally opposite directions may alleviate some of the yaw moment $M_Y$ imparted on one of the wings 30a, 30b. Moreover, the yaw moment $M_Y$ imparted on one of the wings 30a, 30b may be a result of an air collision due to the impact of an object 5 on the aircraft 15, thus creating a force F on one of the wings 30a, 30b. Upon removal of yaw moment $M_Y$, the spring 25 may contract back to the original unstrained position $P_1$ and the buckling member 35 may unbuckle back to the original unbuckled position $P_2$ causing both of the wings 30a, 30b to rotate back to an original wing position $P_3$ (shown in FIGS.

1 and 3A). In an example, the rotation of both of the wings 30a, 30b may occur upon the yaw moment $M_Y$ exceeding a buckling moment $M_B$ derived by a buckling force $F_B$ sufficiently large to cause the buckling member 35 to buckle.

Figure 6:
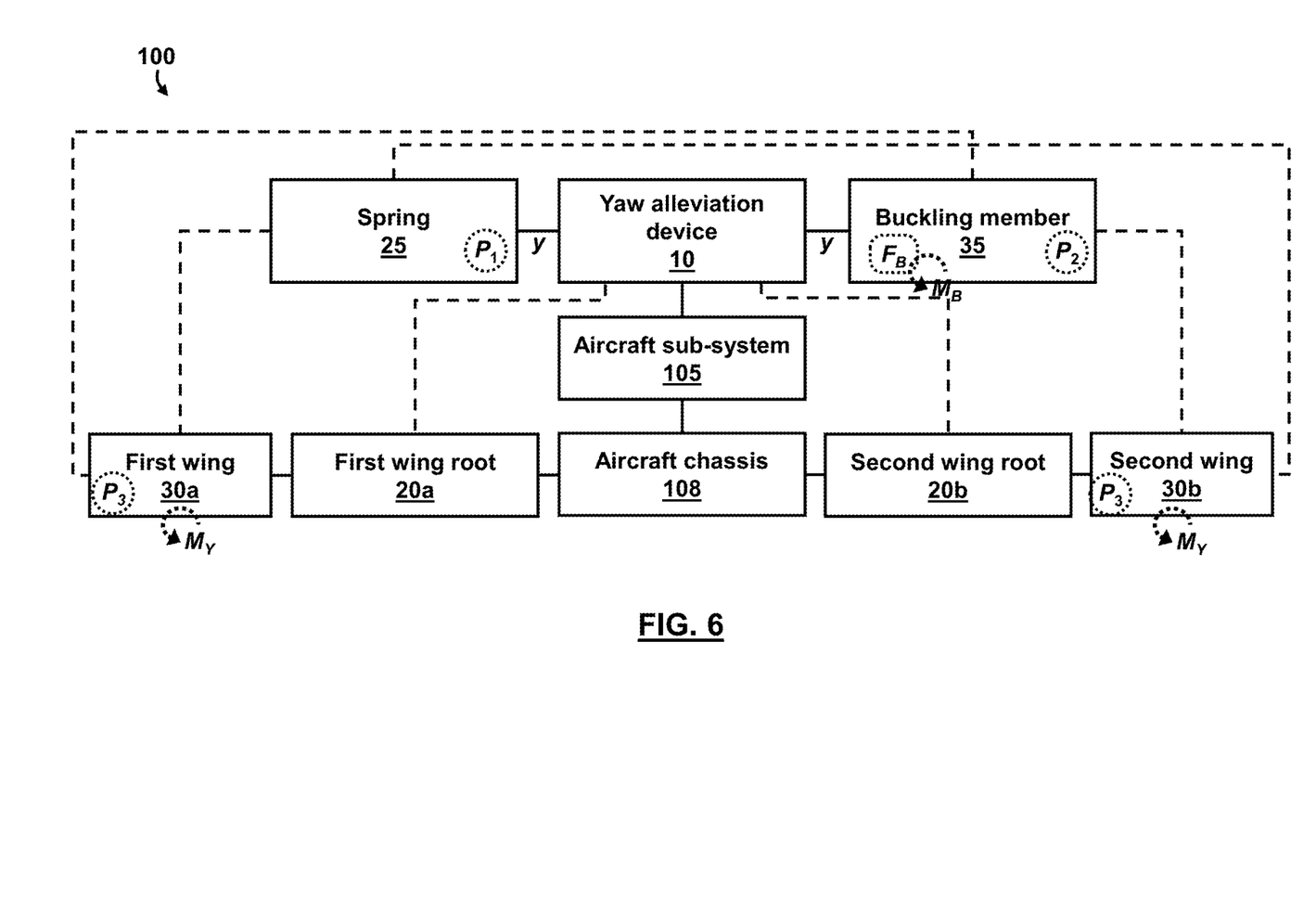
FIG. 6 is a block diagram illustrating a system of controlling yaw alleviation, according to an embodiment herein.

FIG. 6, with reference to FIGS. 1 through 5B, is a block diagram illustrating a system 100 for controlling yaw alleviation. The system 100 comprises an aircraft sub-system 105 comprising an aircraft chassis 108. In an example, the aircraft chassis 108 may comprise part or all of an aircraft fuselage of an unmanned aerial vehicle, for example, or a wing inboard of a wing hinge and a wing outboard of the wing hinge. The system 100 further comprises a first wing root 20a pivotally attached to the aircraft chassis 108, and a second wing root 20b pivotally attached to the aircraft chassis 108 and gear meshed to the first wing root 20a. The pivotal attachment may occur through any suitable mechanism capable of providing a rotational joint/connection between the first wing root 20a and the aircraft chassis 108, and the second wing root 20b and the aircraft chassis 108.

The system 100 further comprises a first wing 30a fixedly attached to the first wing root 20a, and a second wing 30b fixedly attached to the second wing root 20b. The system 100 further comprises a yaw alleviation device 10 operatively connected to the aircraft sub-system 105. The yaw alleviation device 10 comprises a spring 25 operatively connected to the first wing 30a and the second wing 30b. The yaw alleviation device 10 further comprises a buckling member 35 operatively connected to the first wing 30a and the second wing 30b. In an example, the buckling member 35 is positioned parallel and at an offset distance $2y$ to the spring 25. In another example, the buckling member 35 is positioned at an offset angle with respect to the spring 25. According to an example, the spring 25 is configured to extend from an original unstrained position $P_1$ upon the buckling member 35 undergoing buckling from an original unbuckled position $P_2$ to cause a yaw rotation of the first wing root 20a and the second wing root 20b in rotationally opposite directions to counter a yaw moment $M_Y$ imparted on one of the wings 30a/30b.

The yaw alleviation device 10 may generate a resistive moment that resists a rotational moment (e.g., $M_B$) associated with a buckling force $F_B$ of the buckling member 35 times the offset distance $2y$. In an example, upon the yaw moment $M_Y$ being smaller than the resistive moment (e.g., $M_B$), the buckling member 35 does not buckle and the spring 25 does not extend. Moreover, upon the yaw moment $M_Y$ being larger than the resistive moment, the buckling member 35 buckles and the spring 25 may extend, according to an example. Furthermore, upon the buckling member 35 buckling and the spring 25 extending causing rotation of the first wing root 20a with the first wing 30a and the second wing root 20b with the second wing 30b, the yaw moment $M_Y$ becomes no greater than the resistive moment (e.g., $M_B$). In another example, upon removal of the yaw moment $M_Y$, the spring 25 may retract causing the first wing root 20a with the first wing 30a and the second wing root 20b with the second wing 30b to pivot to an original position $P_3$ relative to the aircraft chassis 108.

The embodiments herein solve the issue of aircraft collisions which might cause the vehicle to lose control and crash. When a fixed wing aircraft 15 impacts a rigid object 5 there is a yaw moment $M_Y$ associated with collision causing the vehicle (e.g., aircraft 15) to spin. After impact, the vehicle will need to apply a moment in the opposite direction to correct for the spin using the horizontal tail. The impact yaw moment $M_Y$ increases as the forward flight speed increases and as the impact location moves outboard on the wing 30a/30b.

The yaw alleviation device 10 limits the yaw moment $M_Y$ from impact to a designated threshold value, which may be a predetermined value or a value established in real-time, via buckling of the bucking member 35 and returns the wing 30a/30b to its original position $P_3$ via a restoring moment from the spring 25. The yaw moment $M_Y$ applied to the aircraft 15 by the impact force F does not increase with increased flight speed or impact location when that impact would generate a yaw moment $M_Y$ above the designated threshold value.

Figure 7A:
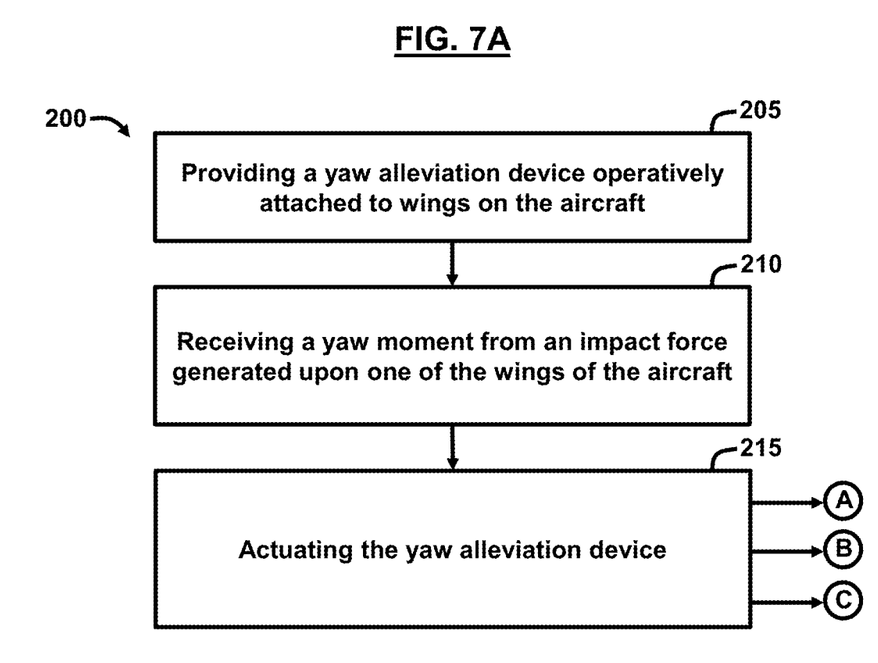
FIGS. 7A through 7D are flow diagrams illustrating a method of performing yaw alleviation of an aircraft, according to an embodiment herein.

FIGS. 7A through 7D, with reference to FIGS. 1 through 6, are flow diagrams illustrating a method 200 of performing yaw alleviation of an aircraft 15. As shown in FIG. 7A, the method 200 comprises providing (205) a yaw alleviation device 10 operatively attached to wings 30a, 30b on the aircraft 15. The yaw alleviation device 10 comprises a spring 25 operatively connected to a first wing 30a and a second wing 30b of the aircraft 15. The yaw alleviation device 10 further comprises a buckling member 35 operatively connected to the first wing 30a and the second wing 30b. The method 200 further comprises receiving (210) a yaw moment $M_Y$ from an impact force F generated upon one of the wings 30a/30b of the aircraft 15. In an example an object 5 coming into contact with the aircraft 15 may generate the impact force F. The method 200 further comprises actuating (215) the yaw alleviation device 10 by extending the spring 25 from an original unstrained position $P_1$ to an extended position $P_4$; and buckling the buckling member 35 from an original unbuckled position $P_2$ to a buckled position $P_5$.

In an example, the extension of the spring 25 and buckling of the buckling member 35 causes a rotation of the first wing root 20a and the second wing root 20b in rotationally opposite directions from an original position $P_3$ to an angled position $P_6$ to counter the yaw moment $M_Y$. According to an example, the actuating (215) of the yaw alleviation device 10 may occur automatically upon the impact force F generated on the aircraft 15 by the object 5. In another example, the actuating (215) of the yaw alleviation device 10 may occur through an electrical and/or mechanical triggering of the yaw alleviation device 10 by an operator through wired or wireless interaction with the yaw alleviation device 10.

Figure 7B:
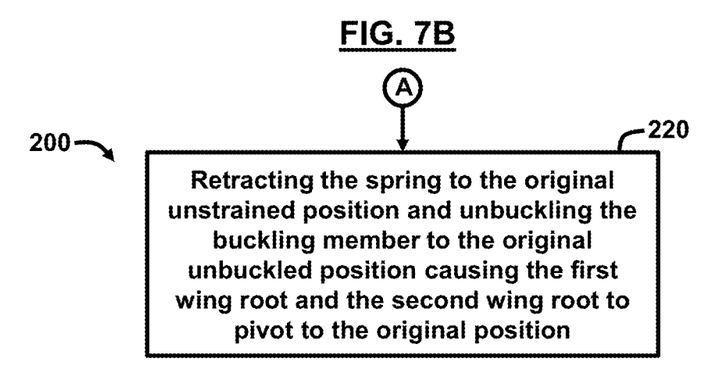
Figure 7C:
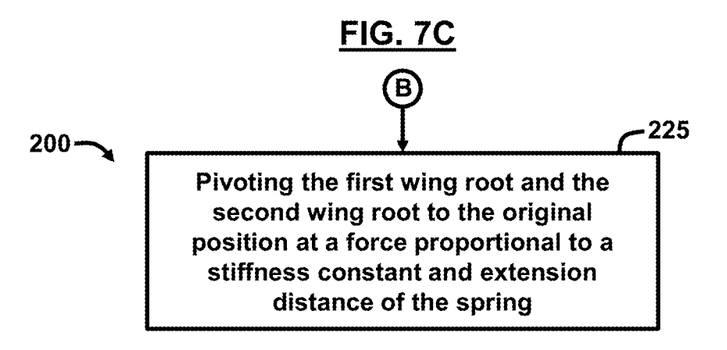
Figure 7D:
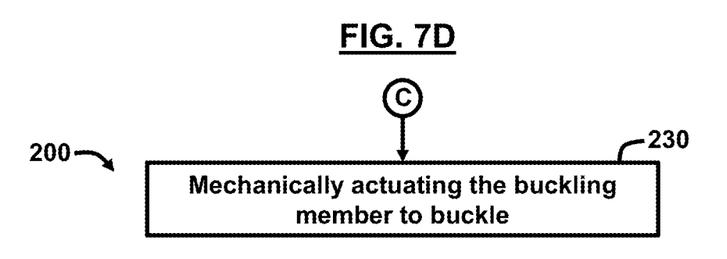

As shown in FIG. 7B, the method 200 may comprise, upon removal of the yaw moment $M_Y$, retracting (220) the spring 25 to the original unstrained position $P_1$ and unbuckling the buckling member 35 to the original unbuckled position $P_2$ causing the first wing root 20a and the second wing root 20b to pivot to the original position $P_3$. This occurs because of the reverse pivoting action of the pair of gears 13a, 13b, which cause the spring 25 to retract and the buckling member 35 to unbuckle. Removal of the yaw moment $M_Y$ automatically causes the pair of gears 13a, 13b to pivot in this reverse configuration since the wings 30a, 30b will automatically revert back to their original position $P_3$ upon removal of the yaw moment $M_Y$. As shown in FIG. 7C, the method 200 may comprise pivoting (225) the first wing root 20a and the second wing root 20b to the original position $P_3$ at a force proportional to a stiffness constant k and extension distance A of the spring 25. As shown in FIG. 7D, the method 200 may comprise mechanically actuating (230) the buckling member 35 to buckle using a mechanical trigger or control mechanism.

The embodiments herein provide an impact reduction and aircraft survivability solution comprising a device 10, system 100, and method 200 which utilizes a spring 25 and buckling member 35. The device 10 maintains structural rigidity when needed with the additional capability of limiting the yaw moment $M_Y$ associated with impacts. The device 10, system 100, and method 200 has been experimentally shown to reduce the yaw moment $M_Y$ due to an impact by more than 50%, thereby increasing the chances of the vehicle (e.g., aircraft 15) recovering from the impact. The device 10, system 100, and method 200 can be configured to not buckle under regular use as well as buckle on command in anticipation of impact. As such, unintended impacts, for which risk is increased when operating in congested environments, can be alleviated using the device 10, system 100, and method 200.

The embodiments herein could be used to increase the mission success rate of small unmanned aerial systems that are sent to operate in congested environments for which collision risk is high. Moreover, the embodiments herein can also significantly reduce the loss rate of aircraft due to in-flight collisions. Furthermore, the embodiments herein can be used to reduce damage as well as vehicle loss by alleviating the loads associated with blade collision for quad copters trying to deliver packages at low altitude. For example, rotorcraft would benefit from similar implementation to rotor blades as low altitude flight brings risks associated with striking objects 5 such as tree branches. Lowering the yaw moment associated with impact lowers the stresses in the blades and would reduce the risk of blades breaking. The embodiments herein can be used limit the rotational moment associated with structural applications other than aircraft. The buckling member 35 can also be buckled on command in order to avoid impact by buckling the device 10 in anticipation of an impact by an object 5. A system on the vehicle can observe an opening that is smaller than the vehicle span, and the autonomy buckles the buckling member 35 causing the wings 30a, 30b to rotate freely from the drag force. The vehicle is then able to travel through the small opening and return the wings 30a, 30b to their original position $P_3$ after clearing the obstacle.

The foregoing description of the specific embodiments will so fully reveal the general nature of the embodiments herein that others may, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein may be practiced with modification within the spirit and scope of the appended claims.

What is claimed is:

1. A yaw alleviation device for an aircraft containing rotatable wing roots attached to wings, the device comprising:
   a spring configured to operatively connect to a wing; and
   a buckling member to operatively connect to the wing,
   wherein the spring is configured to extend from an original unstrained position upon the buckling member undergoing buckling from an original unbuckled position to cause rotation of one or both wings in rotationally opposite directions.

2. The device of claim 1, wherein the buckling member is positioned parallel and at an offset distance to the spring.

3. The device of claim 1, wherein the spring operatively connects to the wing root on each side of the aircraft.

4. The device of claim 1, wherein the buckling member operatively connects to the wing root on each side of the aircraft.

5. The device of claim 1, wherein the rotation of one or both wings in rotationally opposite directions is to alleviate some of a yaw moment imparted on one of the wings.

6. The device of claim 5, wherein the yaw moment imparted on one of the wings is a result of an air collision creating a force on one of the wings.

7. The device of claim 5, wherein upon removal of yaw moment, the spring contracts back to the original unstrained position and the buckling member unbuckles back to the original unbuckled position causing both of the wings to rotate back to an original wing position.

8. The device of claim 5, wherein the rotation of both of the wings occurs upon the yaw moment exceeding a buckling moment derived by a buckling force sufficiently large to cause the buckling member to buckle.

9. The device of claim 1, wherein the buckling member comprises a material that is configured to buckle without fracturing.

10. The device of claim 1, wherein the buckling member comprises any of a metal and a shape memory polymer material.

11. A system comprising:
    an aircraft sub-system comprising:
      an aircraft chassis;
      a first wing root pivotally attached to the aircraft chassis;
      a second wing root pivotally attached to the aircraft chassis and gear meshed to the first wing root;
      a first wing fixedly attached to the first wing root; and
      a second wing fixedly attached to the second wing root;
    a yaw alleviation device operatively connected to the aircraft sub-system, wherein the yaw alleviation device comprises:
      a spring operatively connected to the first wing and the second wing; and
      a buckling member operatively connected to the first wing and the second wing, wherein the buckling member is positioned parallel and at an offset distance to the spring,
    wherein the spring is configured to extend from an original unstrained position upon the buckling member undergoing buckling from an original unbuckled position to cause a yaw rotation of the first wing root and the second wing root in rotationally opposite directions to counter a yaw moment imparted on one of the wings.

12. The system of claim 11, wherein the yaw alleviation device is to generate a resistive moment that resists a rotational moment associated with a buckling force of the buckling member times the offset distance.

13. The system of claim 12, wherein upon the yaw moment being smaller than the resistive moment, the buckling member does not buckle and the spring does not extend.

14. The system of claim 12, wherein upon the yaw moment being larger than the resistive moment, the buckling member buckles and the spring extends.

15. The system of claim 14, wherein upon the buckling member buckling and the spring extending causing rotation of the first wing root with the first wing and the second wing root with the second wing, the yaw moment becomes no greater than the resistive moment.

16. The system of claim 14, wherein upon removal of the yaw moment, the spring retracts causing the first wing root with the first wing and the second wing root with the second wing to pivot to an original position relative to the aircraft chassis.

17. A method of performing yaw alleviation of an aircraft, the method comprising:
providing a yaw alleviation device operatively attached to wings on the aircraft, wherein the yaw alleviation device comprises:
a spring operatively connected to a first wing and a second wing of the aircraft; and
a buckling member operatively connected to the first wing and the second wing;
receiving a yaw moment from an impact force generated upon one of the wings of the aircraft; and
actuating the yaw alleviation device by:
extending the spring from an original unstrained position to an extended position; and
buckling the buckling member from an original unbuckled position to a buckled position,
wherein extension of the spring and buckling of the buckling member causes a rotation of the first wing root and the second wing root in rotationally opposite directions from an original position to counter the yaw moment.

18. The method of claim 17, comprising, upon removal of the yaw moment, retracting the spring to the original unstrained position and unbuckling the buckling member to the original unbuckled position causing the first wing root and the second wing root to pivot to the original position.

19. The method of claim 18, comprising pivoting the first wing root and the second wing root to the original position at a force proportional to a stiffness constant and extension distance of the spring.

20. The method of claim 17, comprising mechanically actuating the buckling member to buckle.

* * * * *